United States Patent
Böttcher

(10) Patent No.: US 11,205,158 B2
(45) Date of Patent: Dec. 21, 2021

(54) SERVICE UNIT AND METHOD FOR MONITORING AND DOCUMENTING MAINTENANCE WORK

(71) Applicant: Sartorius Stedim Biotech GmbH, Göttingen (DE)

(72) Inventor: Lars Böttcher, Melsungen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 423 days.

(21) Appl. No.: 16/307,594

(22) PCT Filed: Jun. 2, 2017

(86) PCT No.: PCT/EP2017/063424
§ 371 (c)(1),
(2) Date: Dec. 6, 2018

(87) PCT Pub. No.: WO2017/211706
PCT Pub. Date: Dec. 14, 2017

(65) Prior Publication Data
US 2019/0303884 A1 Oct. 3, 2019

(30) Foreign Application Priority Data
Jun. 7, 2016 (DE) ...................... 10 2016 110 462.0

(51) Int. Cl.
*G06Q 50/10* (2012.01)
*G06Q 10/00* (2012.01)
(Continued)

(52) U.S. Cl.
CPC ............... *G06Q 10/20* (2013.01); *B25F 5/00* (2013.01); *G06F 1/163* (2013.01); *H04W 4/38* (2018.02);
(Continued)

(58) Field of Classification Search
None
See application file for complete search history.

(56) References Cited

U.S. PATENT DOCUMENTS

| 2003/0160075 A1 | 8/2003 | Musarella et al. |
| 2006/0193262 A1 | 8/2006 | McSheffrey et al. |

(Continued)

FOREIGN PATENT DOCUMENTS

| DE | 10 2011 005 646 A1 | 9/2012 |
| DE | 10 2011 101 554 A1 | 11/2012 |

(Continued)

OTHER PUBLICATIONS

International Search Report of PCT Application No. PCT/EP2017/063424, dated Sep. 22, 2017.

*Primary Examiner* — Jan P Mincarelli
(74) *Attorney, Agent, or Firm* — Pearl Cohen Zedek Latzer Baratz LLP

(57) ABSTRACT

The invention relates to a service unit that can be carried on the body of a user by means of a carrying system, having at least one power source for supplying power to electrically operated tools connectable to the power source, the power source being formed from at least one rechargeable battery. The invention also relates to a method for monitoring and documenting maintenance work. The invention is distinguished in that the carrying system has an integrated computation and documentation unit for monitoring and documenting maintenance work, wherein the computation and documentation unit is powered from the power source, wherein the computation and documentation unit is connected to at least one motion sensor and/or locating sensor and wherein the motion sensor is arranged on the tool or the hand of the user.

11 Claims, 2 Drawing Sheets

(51) Int. Cl.
*H04W 4/38* (2018.01)
*G06F 1/16* (2006.01)
*H04W 84/12* (2009.01)
*B25F 5/00* (2006.01)
*A45F 3/04* (2006.01)
*H01M 50/256* (2021.01)

(52) U.S. Cl.
CPC .............. *H04W 84/12* (2013.01); *A45F 3/04* (2013.01); *H01M 50/256* (2021.01); *H01M 2220/30* (2013.01)

(56) References Cited

U.S. PATENT DOCUMENTS

| | | | |
|---|---|---|---|
| 2009/0272779 A1* | 11/2009 | Vu | A45F 5/00 |
| | | | 224/677 |
| 2014/0103858 A1 | 4/2014 | Bertsch et al. | |
| 2015/0220071 A1 | 8/2015 | Hahn et al. | |
| 2016/0255942 A1* | 9/2016 | Wagner | B25F 5/00 |
| 2017/0014984 A1* | 1/2017 | Rola | B25F 5/00 |
| 2017/0197302 A1* | 7/2017 | Kobayashi | G06T 7/001 |

FOREIGN PATENT DOCUMENTS

| | | |
|---|---|---|
| DE | 10 2012 217 572 A1 | 3/2014 |
| DE | 10 2013 214 576 A1 | 1/2015 |
| WO | WO 00/18546 A1 | 4/2000 |
| WO | WO 2015/185974 A1 | 12/2015 |

\* cited by examiner

# SERVICE UNIT AND METHOD FOR MONITORING AND DOCUMENTING MAINTENANCE WORK

CROSS-REFERENCE TO RELATED APPLICATIONS

This application is a National Phase Application of PCT International Application No. PCT/EP2017/063424, International Filing Date Jun. 2, 2017, claiming priority of German Patent Application No. 10 2016 110 462.0, filed Jun. 7, 2016, which is hereby incorporated by reference.

FIELD OF THE INVENTION

The invention relates to a service unit that can be carried on the body of a user by means of a carrying system, having at least one power source for supplying power to electrically operated tools, devices or machines connectable to the power source, the power source being at least one rechargeable battery.

The invention also relates to a method for monitoring and documenting maintenance work having a service unit according to the claims.

BACKGROUND OF THE INVENTION

In particular for large bioreactors with a height of up to three meters, maintenance must be carried out with various tools, all of which are operated electrically. Longer power cables are a hindrance during maintenance work and the common batteries of hand-operated tools are quickly depleted and require time-consuming recharging.

Furthermore, certain biotech manufacturing equipment may be subject to documentation requirements, also in conjunction with bioreactors, where applicable. Such work or maintenance operations include, for example, plastic and tube welding. Other operations are, for example, installation supervision and documentation or the installation of a single-use container in a receiving steel container, including documentation. The documentation may include, among other things, how often, when and where a service (for example, an installation supervision) has been performed or where, when and with which steps a disposable container has been inserted into a steel container. The documentation can include an electronic signature, the individuals involved, as well as the material used. It is often not possible, or is not desired by the customer, that the maintenance operations are recorded and documented using the customer's company network.

WO 00/18546 A1 discloses a service unit that serves as a power supply unit for electrical appliances such as electrically operated tools, and proposes to power serial, standard "battery devices" with a rechargeable battery arranged on the body of the user by providing a cable that has an adapter in the direction of the hand-held device, which battery can be inserted into the space provided on such device for the rechargeable battery. The rechargeable battery is equipped with an element or carrying system that can be arranged on the user and that is configured as a belt, backpack or carrying bag.

DE 10 2011 101 554 A1 further discloses a "battery backpack" service unit that can be carried on the body of a user using a carrying system, and that is configured in particular as a backpack, belt or carrying bag with a mount and one or more rechargeable batteries for operating devices and hand-held equipment such as drills, screwdrivers, sanders, saws, hand tools and other equipment. The battery or the rechargeable battery in the carrying device can be used as a single energy source or as an additional source of energy for the device or, if necessary, for the original battery for the unit.

The disadvantage of the service units known from prior art is that the maintenance work must be interrupted for documenting the maintenance work and that there is a risk that certain work steps are not sufficiently documented, for example, because no documentation units are available at the work site.

DE 10 2012 217 572 A1 discloses a control system for the maintenance of machines, which has a control panel that can be attached both to the machine and to a carrying device on the belt of a user. The control system further has a signal generator with a receiver to which alarm and warning signals can be transmitted by a transmitter of the control device. The signal generator can be arranged on the wrist of the user. Both the signal generator and the control unit require a separate power supply.

Here, again, the disadvantage is that the maintenance work must be interrupted for the documentation of the maintenance work and that there is a risk that certain work steps are not sufficiently documented, for example, because no documentation units are available at the work site. A further disadvantage, for example in the case of large bioreactors with a height of up to three meters, is that maintenance must be carried out with various tools, all of which are operated electrically. Longer power cables are a hindrance during maintenance work and the common batteries of hand-operated tools are quickly depleted and require time-consuming recharging.

DE 10 2013 214 576 A1 discloses a method and a device for determining a position by means of a portable motion sensor. Forming a mobile terminal as an electronic accessory allows for the better determination of a user activity if the accessory is connected securely to the body of the person. With regard to sensors, the accessory can only have a motion sensor. Its sensor signals can be, for example, transmitted to a mobile unit formed as a smart phone, signals of further sensors in the smart phone also being processed to determine the position of a person carrying the accessory and also the smart phone.

SUMMARY OF THE INVENTION

It is the object of the present invention to improve the service units known from prior art such that the monitoring and documentation of maintenance work is easier and more accurate.

A further object is to provide an improved method for monitoring and documenting maintenance work with a service unit.

This object with respect to the service unit is attained in that the carrying system has an integrated computation and documentation unit for monitoring and documenting maintenance work.

The integrated computation and documentation unit, which can be powered from the power source of the service unit, ensures accurate monitoring and fast documentation of maintenance work. No long interruptions are necessary for documenting the work steps.

For the purposes of this application, the tools also include equipment or machines used during maintenance operations.

In one preferred embodiment of the invention, the computation and documentation unit has a data memory to retrieve and store data, as well as at least one data input device. If required, instructions or information for the maintenance work to be carried out can be retrieved from the data memory. Performed maintenance work can be entered and saved in the data memory via a data input device. The data input device can be both a keyboard and a touchscreen.

Data input and/or data memory can be connected to a network (e.g. WLAN, local network, cloud). Furthermore, the exchange of data in both directions is secured in order to carry out an activity as expected.

Instructions and information can consist of, among other things, service manuals, SOPs (Standard Operating Procedures), specified instructions, operating regulations or safety instructions. For voice input, the data input device or the computation and documentation unit can also be connected to a microphone. Voice input via a microphone allows the user to keep the tool in his hand during the input.

In accordance with another preferred embodiment of the invention, the computation and documentation unit is connected to a camera that can be carried on the body of the user. The camera can be attached to the sidepieces of a pair of glasses of the user, for example. However, it is also possible to arrange the camera on the shoulder or in another area of the body of the user (e.g. contact lens). Recording with the camera ensures quasi seamless verification of performed maintenance work. The documentation unit can also be used for creating electronic records, for example, in accordance with FDA Standard Title 21 CFR Part 11.

In another preferred embodiment of the invention the computation and documentation unit is connected with a data output device. Data to be output can be displayed on a monitor, for example. However, it is also possible to reflect the data to be output in a mirrored part of a pair of glasses of the user. In principle, however, it is also possible for data to be output acoustically with a loudspeaker or to print them with a printer, which can be portable. The output data can also be forwarded via a connected network.

In another preferred embodiment of the invention, the computation and documentation unit is connected with a motion sensor and/or a location sensor, wherein at least the motion sensor is arranged on the tool or the hand of the user. The movement performed with the tool can be detected by the motion sensor and recorded by the computation and documentation unit.

According to one preferred embodiment of the invention, the motion sensor is embodied as a gyro sensor known to the person skilled in the art. In particular, it is also possible for the gyro sensor to be connected to a GPS system, enabling more accurate detection and recording of the movements performed by the tool in space.

The tool can be a heated knife for the easy cutting of plastic, for example. But the electrically operated tool can also be plastic welding equipment for welding plastics. It is also possible for the electrically operated tool to be embodied as a screw tool, for example.

In one preferred embodiment of the invention the carrying system is embodied as a backpack or as a carrying strap system or as a combination thereof. In particular, the relatively heavy and large power source is preferably arranged on the back of the user so that the user is provided with relatively great freedom of movement in his front area.

In a further preferred embodiment of the invention, the carrying system has a fold-out tray in the user's belt front area, on which tray tools can be placed, if necessary. In principle, however, the tray can also be embodied as a fold-out display device/display.

In another preferred embodiment of the invention the computation and documentation unit can be connected via a wireless network, or a corporate network or WLAN or another network (for example, a local area network) to an external computer, thereby making it possible to retrieve service information from the external computer or to save maintenance information about the performed maintenance on the external computer.

The object of the method is achieved in conjunction with the preamble to claim 11 in that the maintenance steps to be carried out for the maintenance work can be retrieved by the user by means of the computation and documentation unit, when needed, and in that the computation and documentation unit monitors and documents the individual maintenance steps.

As a result of the monitoring and documenting of individual maintenance steps by the computation and documentation unit, maintenance can be performed in a relatively uninterrupted fashion and can be accurately and reliably documented with the service unit. This allows for faster, and, at the same time, more accurate work.

In one preferred embodiment of the method, the maintenance work is performed on biotechnical or pharmaceutical production equipment.

In another preferred embodiment of the method, the maintenance work is performed in a laboratory area.

The method according to the invention and the device according to the invention are especially suited for quickly and reliably fulfilling strict documentation requirements that apply to certain biotechnical production equipment.

Preferred embodiments are the subject of the dependent claims.

Further features and advantages of the invention result from the following specific description and the drawings.

DETAILED DESCRIPTION OF THE INVENTION

Figure 1:
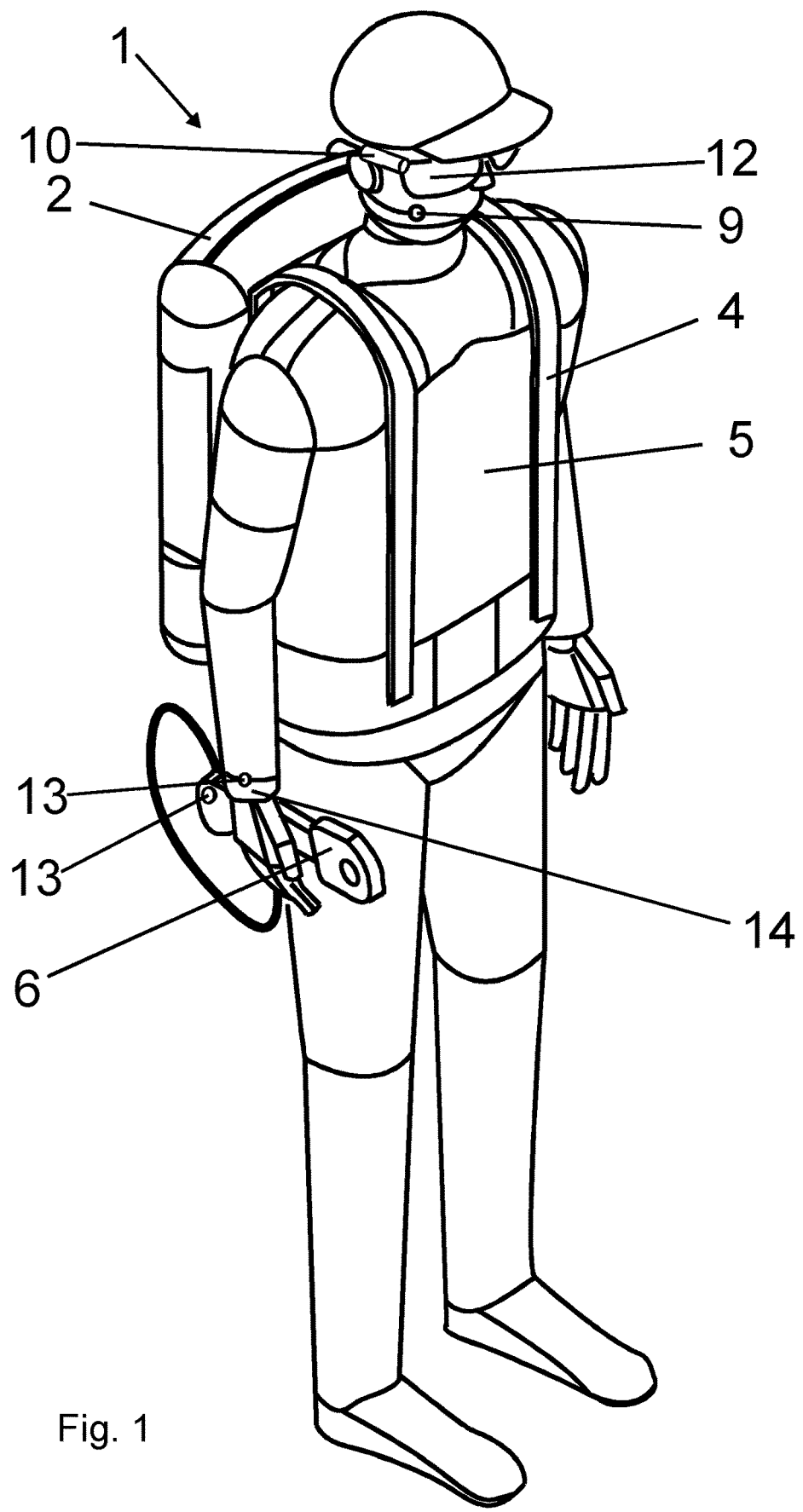
FIG. 1: A spatial representation of a user with a service unit.
Figure 2:
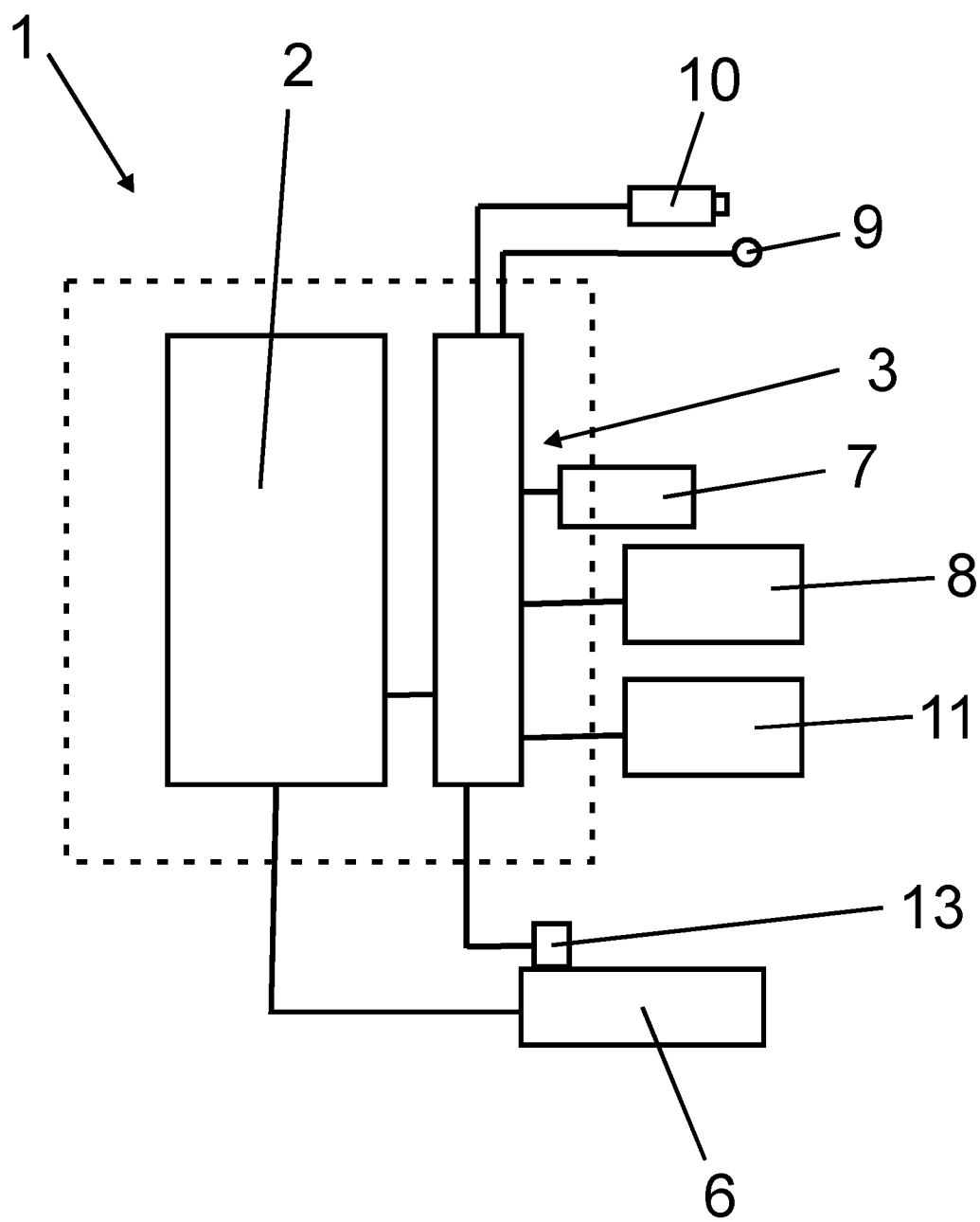
FIG. 2: is a block diagram of a service unit.

A service unit (1) consists essentially of a power source (2), a computation and documentation unit (3) and a carrying system 4. The service unit (1) with the power source (2) and the computation and documentation unit (3) is carried in the carrying system (4) for service purposes by a user (5). The power source (2) consists of at least one rechargeable battery and is designed to supply power to electrically operated tools (6) that can be connected to the power source (2). Different tools (6) can be supplied with different voltage and power. The computation and documentation unit (3), which, for example, can also be formed as a computer or notebook, can also be powered by the power source (2), in principle. The computation and documentation unit (3) has a data memory (7) to retrieve and store data. Further, the computation and documentation unit (3) has at least one data input device (8) for entering data. The data input device (8) can be formed as a keypad or touchscreen, for example. A microphone (9) connected to the computation and documentation unit (3) can also be used to enter data in acoustic form. In addition, a camera (10) connected to the computation and documentation unit (3) can be used to document and enter data. The camera (10) is preferably arranged on the body of the user (5), for example, on the user's head. In principle, however, it is also possible to arrange the camera (10) on the tool (6). The computation and documentation unit (3) is also connected to a data output unit (11). The data of the data output unit (11) can be displayed on a display or screen that is not depicted. However, it is also possible, in principle, to reflect the data of the data output device in a part of the pair of glasses (12) worn by the user. The computation and documentation unit (3) is connected to a motion sensor (13). The motion sensor (13) can be arranged on the tool (6) or the hand (14) of the user (5), for example. The motion sensor (13) can be formed, in particular, as a gyro sensor known to the person skilled in the art. The electrically operated tool (6) can be embodied, for example, as a heated knife or plastic welding device or screw tool.

A fold-out tray, which is not depicted, can be arranged in the carrying system (4) in the user's (5) front belt area. In principle, it is also possible for the computation and documentation unit (3) to be connected to a computer (not depicted) over a wireless network or another network.

Of course, the embodiments discussed in the specific description and shown in the figures are merely illustrative exemplary embodiments of the present invention. In light of this disclosure, a person skilled in the art is given a wide range of possible variations.

LIST OF REFERENCE NUMBERS

1 Service unit
2 Power source
3 Computation and documentation unit
4 Carrying system
5 User
6 Tool
7 Data memory
8 Data input device
9 Microphone
10 Camera
11 Data output unit
12 Glasses
13 Motion sensor
14 Hand

The invention claimed is:

1. A service unit that can be carried on the body of a user by means of a carrying system, having at least one power source for supplying power to electrically operated tools connectable to the power source, the power source being formed from at least one rechargeable battery, wherein:
the carrying system has an integrated computation and documentation unit for monitoring and documenting maintenance work, and comprises a belt with a fold-out tray in a front area thereof, wherein the fold-out tray can be folded out while the carrying system is carried on the user's body,
the computation and documentation unit is powered from the power source,
the computation and documentation unit is connected to at least one motion sensor, and
the motion sensor is arranged on the tool or the hand of the user.

2. The service unit according to claim 1, wherein the computation and documentation unit has a data memory for retrieving and storing data and has at least one data input device.

3. The service unit according to claim 1, wherein the computation and documentation unit is connected to a portable camera on the body of the user.

4. The service unit according to claim 1, wherein the computation and documentation unit is connected to a data output unit.

5. The service unit according to claim 1, wherein the motion sensor is embodied as a gyro sensor.

6. The service unit according to claim 1, wherein the electrically operated tool is a heated knife or a plastic welding device or a screw tool.

7. The service unit according to claim 1, wherein the carrying system is embodied as a backpack or a carrying strap system or a combination thereof.

8. The service unit according to claim 1, wherein the computation and documentation unit is connectable to an external computer via a wireless network, or a WLAN or another network.

9. A method for monitoring and documenting maintenance work with a service unit according to claim 1, wherein
the maintenance steps to be carried out for the maintenance work are retrieved by the user by means of the computation and documentation unit, when needed,
the computation and documentation unit monitors and documents the individual maintenance steps performed.

10. The method according to claim 9, wherein the maintenance work is performed on biotech or pharmaceutical production equipment.

11. The method according to claim 9, wherein the maintenance work is performed in a laboratory area.

* * * * *